(12) United States Patent
Miklosovic et al.

(10) Patent No.: US 9,998,053 B2
(45) Date of Patent: Jun. 12, 2018

(54) SYSTEM AND METHOD FOR IMPROVED MOTOR DRIVE TUNING

(71) Applicant: Rockwell Automation Technologies, Inc., Mayfield Heights, OH (US)

(72) Inventors: Robert J. Miklosovic, Chardon, OH (US); Brian Fast, Kirtland, OH (US); Mark Chaffee, Chagrin Falls, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 64 days.

(21) Appl. No.: 14/842,538

(22) Filed: Sep. 1, 2015

(65) Prior Publication Data

US 2017/0063269 A1    Mar. 2, 2017

(51) Int. Cl.
*G05B 11/01*    (2006.01)
*H02P 23/14*    (2006.01)
(Continued)

(52) U.S. Cl.
CPC .............. *H02P 23/14* (2013.01); *G05B 13/02* (2013.01); *H02P 23/0004* (2013.01)

(58) Field of Classification Search
CPC ........ H02P 21/143; H02P 21/13; H02P 23/12; H02P 21/0017; G05B 2219/37388; G05B 2219/37621; G05B 2219/40358; G05B 2219/42078; G05B 2219/41166; G05B 2219/41381; G05B 2219/39355; G05B 2219/41367; G05B 2219/41368
(Continued)

(56) References Cited

U.S. PATENT DOCUMENTS

| 5,495,158 A | 2/1996 | Schmidt et al. |
| 6,144,181 A * | 11/2000 | Rehm ...................... G05B 5/01 318/609 |

(Continued)

FOREIGN PATENT DOCUMENTS

| DE | 102006046386 A1 | 9/2007 |
| EP | 2852048 A1 | 3/2015 |
| WO | 2007/136828 A2 | 11/2007 |

OTHER PUBLICATIONS

Yasakawa, AC Servo Drives £-V Series User's Manual, Manual No. SIEP S 800000 60C, Sep. 19, 2014, pp. 5-1 to 5-65.
(Continued)

*Primary Examiner* — Bickey Dhakal
(74) *Attorney, Agent, or Firm* — Boyle Fredrickson, SC (57) ABSTRACT

An improved system for controlling operation of a motor with a motor drive is disclosed. The motor drive includes a control module having an inner control loop operable to generate a torque reference signal and a load observer operable to generate an estimate of the torque present on the motor. The torque estimate is summed with the torque reference signal to generate a modified torque reference. The bandwidth of the load observer is set wide enough to generate the estimated torque over a desired operating range of the motor. The control module may also include a low pass filter and at least one tracking notch filter. The low pass filter suppresses vibrations at high frequencies, and the tracking notch filter suppresses resonances present at frequencies above the bandwidth of the load observer and within the pass band of the low pass filter.

14 Claims, 3 Drawing Sheets

(51) Int. Cl.
*G05B 13/02* (2006.01)
*H02P 23/00* (2016.01)

(58) Field of Classification Search
USPC .......................................................... 318/560
See application file for complete search history.

(56) References Cited

U.S. PATENT DOCUMENTS

| | | | | |
|---|---|---|---|---|
| 6,597,146 | B1* | 7/2003 | Rehm | G05B 5/01 |
| | | | | 318/606 |
| 6,784,632 | B2* | 8/2004 | Tomita | G05B 19/19 |
| | | | | 318/560 |
| 7,141,946 | B2 | 11/2006 | Rehm et al. | |
| 7,345,443 | B2* | 3/2008 | Yoshiura | G05B 19/404 |
| | | | | 318/432 |
| 2003/0201747 | A1* | 10/2003 | Chaffee | G05B 13/024 |
| | | | | 318/630 |
| 2008/0203960 | A1* | 8/2008 | Golownia | G01M 1/10 |
| | | | | 318/646 |
| 2010/0060226 | A1* | 3/2010 | Ide | H02P 6/10 |
| | | | | 318/611 |
| 2015/0101421 | A1* | 4/2015 | Takahashi | H02P 6/06 |
| | | | | 73/862.325 |
| 2017/0040916 | A1* | 2/2017 | Yoshiura | H02P 29/00 |

OTHER PUBLICATIONS

Mitsubishi, General-Purpose AC Servo. MELSERVO-J4 Servo Amplifier Instruction Manual, Manual No. SH 030105-E, Apr. 2015, pp. 5-1 to 7-31.
Panasonic, Operating Instructions (Overall) AC Servo Motor & Drives, MINAS A5II/A5 Series, Mar. 19, 2014, pp. 4-1 to 5-62.
Rockwell Automation Publication MOTION-AT005A-EN-P, Out-of-Box Tuning, Mar. 2014, pp. 21-28.
Extended European Search Report dated Mar. 6, 2017; Application No. 16186558.9—(5) pages.

* cited by examiner

FIG. 5

SYSTEM AND METHOD FOR IMPROVED MOTOR DRIVE TUNING

BACKGROUND OF THE INVENTION

The subject matter disclosed herein relates generally to tuning a motor drive and, more specifically, to a method for providing settings in a motor drive system resulting in improved tuning-less performance for customers.

As is known to those skilled in the art, motor drives are utilized to control operation of a motor. According to one common configuration, a motor drive includes a DC bus having a DC voltage of suitable magnitude from which an AC voltage may be generated and provided to the motor. The DC voltage may be provided as an input to the motor drive or, alternately, the motor drive may include a rectifier section which converts an AC voltage input to the DC voltage present on the DC bus. The motor drive includes power electronic switching devices, such as insulated gate bipolar transistors (IGBTs), thyristors, or silicon controlled rectifiers (SCRs). The power electronic switching device further includes a reverse conduction power electronic device, such as a free-wheeling diode, connected in parallel across the power electronic switching device. The reverse conduction power electronic device is configured to conduct during time intervals in which the power electronic switching device is not conducting. A controller in the motor drive generates switching signals to selectively turn on or off each switching device to generate a desired DC voltage on the DC bus or a desired motor voltage.

The motor drive receives a command signal which indicates the desired operation of the motor. The command signal may be a desired position, speed, or torque at which the motor is to operate. The position, speed, and torque of the motor are controlled by varying the amplitude and frequency of the AC voltage applied to the stator. The motor is connected to the output terminals of the motor drive, and the controller generates the switching signals to rapidly switch the switching devices on and off at a predetermined switching frequency and, thereby, alternately connects or disconnects the DC bus to the output terminals and, in turn, to the motor. By varying the duration during each switching period for which the output terminal of the motor drive is connected to the DC voltage, the magnitude of the output voltage is varied. The motor controller utilizes modulation techniques such as pulse width modulation (PWM) to control the switching and to synthesize waveforms having desired amplitudes and frequencies.

In order to convert the command signal to the desired output voltage, the motor drive includes a control section. The control section may vary in complexity according to the performance requirements of the motor drive. For instance, a motor drive controlling operation of a pump may only need to start and stop the pump responsive to an on/off command. The motor drive may require minimal control such as an acceleration and deceleration time for the pump. In contrast, another motor drive may control a servo motor moving, for example, one axis of a machining center or an industrial robotic arm. The motor drive may need to not only start and stop the motor, but operate at various operating speeds and/or torques or follow a position command. The motor control may include multiple control loops, such as a position, velocity, torque, or current control loop, or a combination thereof. Each control loop may include, for example, a proportional (P), integral (I), or derivative (D) controller and an associated controller gain value for each controller in the control loop and may further require additional feedback and/or feed forward controller gain values. In order to achieve the desired operating performance of the motor, it is necessary to properly select the controllers and the associated controller gain values associated with each control loop.

However, selecting the controllers and associated controller gain values may be a complex process. Adjustment of a controller gain value in one control loop may impact performance of another control loop. Although the control loops may be in parallel or in series with each other, there is ultimately a single input and a single output for the control system. Adjusting a controller gain value along one loop impacts the performance of one or more other controller gain values. The interaction of controller gain values often requires a time and labor-intensive iterative approach to selecting gain values in order to achieve the desired level of performance.

The dynamics of a load connected to the motor typically requires further adjustment of gain values. A load that is rigidly coupled to the motor usually requires different gain values than a load that has a compliant coupling or a coupling with backlash between the load and the motor. Gain values are lowered as the level of compliance and/or backlash increases. As the ratio of load inertia to motor inertia increases, the effects of compliance and backlash are amplified. For example, a coupling with a small level of compliance and a high ratio of load inertia to motor inertia typically results in significantly lower controller gain values than for the same coupling and a low ration of load inertia to motor inertia. Controller gain values that produce desired performance with a rigidly coupled load may excite resonant operating points with a compliantly coupled load. Consequently, varying levels of compliance and/or backlash result in a unique set of controller gain values for each application. Successfully setting the controller gain values to achieve a desired level of performance for each application typically takes time and requires a skilled technician. Many companies don't have such a technician and may need to hire a field service technician from the manufacturer of the motor drive. This can add significantly to the cost to start up and commission a new control system. Some companies may elect to set the controller gain values to a reduced performance level to ensure stability of the controlled system. However, the reduced performance level may result in lost revenue during operation due to operating at less than maximum capacity.

Thus, it would be desirable to provide a motor drive with settings which result in improved tuning-less performance for customers.

BRIEF DESCRIPTION OF THE INVENTION

The subject matter disclosed herein describes a system and method for providing a motor drive having controller settings which will result in improved tuning-less performance for customers. The motor drive includes a control module having a control loop operable to generate an acceleration reference signal to achieve desired operation of a motor connected to the motor drive and a load observer operable to generate a signal that estimates the acceleration required as a result of a load torque present on the motor. The acceleration estimate signal is combined with the acceleration reference signal to generate a modified acceleration reference signal which will generate desired motion similar to an unloaded motor connected to the motor drive. A bandwidth of the load observer is set wide enough to generate the acceleration estimate over a desired operating range of the motor. Controller gain values for a velocity loop and a position loop within the control module are determined as a function of the bandwidth of the load observer. The control module includes at least one filter and, according to one embodiment of the invention, includes a low pass filter and at least one tracking notch filter. The pass band of the low pass filter is set greater than the bandwidth of the load observer and, preferably, about five times greater than the bandwidth of the load observer. The low pass filter suppresses vibrations at high frequencies. The tracking notch filter may then be used to suppress resonances present at frequencies above the bandwidth of the load observer and within the pass band of the low pass filter. The motor drive monitors feedback from the motor to determine the frequency of the resonance with the largest amplitude during operation of the motor. The motor drive will adjust the frequency of the notch filter to track the frequency of the resonance and mitigate or cancel the effects of the resonance during operation of the motor.

According to one embodiment of the invention, a method for controlling operation of a motor operatively connected to a motor drive is disclosed. A bandwidth for a load observer executable in the motor drive is determined, where the bandwidth is greater than or equal to an expected torque response generated from a load operatively connected to the motor. A motor inertia value is read from a memory of the motor drive, where the motor inertia value corresponds to an inertia value for the motor when no load is connected to the motor. A processor in the motor drive executes a control module, which includes a control loop, the load observer, a summing junction, at least one filter, and an inertia scaling factor. The control loop generates a first acceleration reference signal corresponding to a desired operation of the motor, and the load observer generates an estimated acceleration signal corresponding to the load present on the motor. The summing junction combines the first acceleration reference signal and the estimated acceleration signal to generate a second acceleration reference signal. The filter is configured to receive the second acceleration reference signal as an input and provide a filtered acceleration reference signal as an output, and the inertia scaling factor is a gain applied to the filtered acceleration reference signal to generate a desired torque command for the motor. Either a desired voltage or a desired current is supplied from the motor drive to the motor as a function of the desired torque command.

According to another embodiment of the invention, a motor drive for controlling a motor operatively connected to the motor drive is disclosed. The motor drive includes a DC bus having a positive rail and a negative rail, an inverter section, a memory device, and a controller. The DC bus is operable to receive a DC voltage between the positive rail and the negative rail. The inverter section has a plurality of switching elements, where each switching element is controlled by a gating signal. The inverter section is operable to receive the DC voltage from the DC bus and provide an AC voltage at an output of the motor drive. The memory device is operable to store a plurality of instructions and a plurality of configuration parameters, where the configuration parameters include a motor inertia value corresponding to an unloaded state of the motor. The controller is operable to execute the plurality of instructions to determine a bandwidth for the load observer, where the bandwidth is greater than or equal to an expected torque response bandwidth generated from a load operatively connected to the motor. The controller reads the motor inertia value from the memory device and sets an inertia scaling factor equal to the motor inertia value. A first acceleration reference signal, corresponding to a desired operation of the motor, is generated with a control loop and an estimated acceleration signal, corresponding to the load present on the motor, is generated with a load observer. The first acceleration reference signal and the estimated acceleration signal are combined at a summing junction to generate a second acceleration reference signal. At least one filter, configured to receive the second acceleration reference signal as an input and provide a filtered acceleration reference signal as an output, is executed. The inertia scaling factor is applied to the filtered acceleration reference signal to generate a desired torque command for the motor. The motor drive also includes a gate driver module operable to generate the gating signal for each of the plurality of switching elements in the inverter section as a function of the desired torque command from the controller.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

Figure 1:
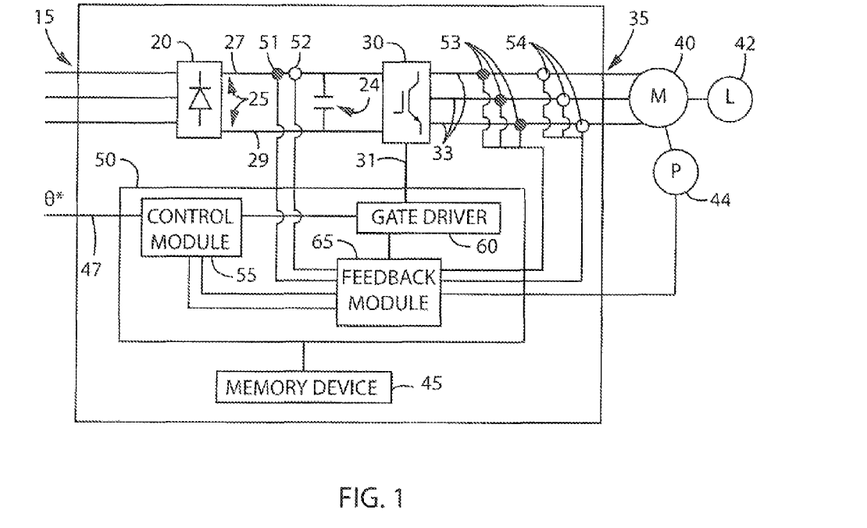
FIG. 1 is a block diagram of a motor drive incorporating one embodiment of the present invention.
Figure 2:
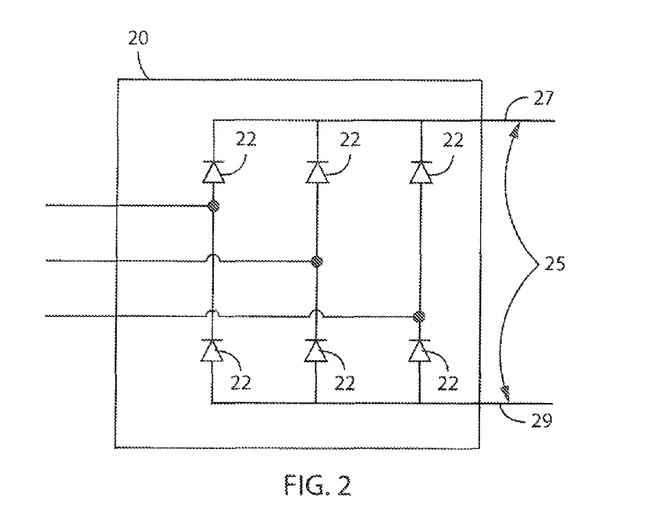
FIG. 2 is a block diagram representation of a rectifier section from the motor drive of FIG. 1.

Turning initially to FIG. 1, a motor drive 10, according to one embodiment of the invention, is configured to receive a three-phase AC voltage at an input 15 of the motor drive 10 which is, in turn, provided to a rectifier section 20 of the motor drive 10. The rectifier section 20 may include any electronic device suitable for passive or active rectification as is understood in the art. With reference also to FIG. 2, the illustrated rectifier section 20 includes a set of diodes 22 forming a diode bridge that rectifies the three-phase AC voltage to a DC voltage on the DC bus 25. Optionally, the rectifier section 20 may include other solid state devices including, but not limited to, thyristors, silicon controlled rectifiers (SCRs), or transistors to convert the input power 15 to a DC voltage for the DC bus 25. The DC voltage is present between a positive rail 27 and a negative rail 29 of the DC bus 25. A DC bus capacitor 24 is connected between the positive and negative rails, 27 and 29, to reduce the magnitude of the ripple voltage resulting from converting the AC voltage to a DC voltage. It is understood that the DC bus capacitor 24 may be a single capacitor or multiple capacitors connected in parallel, in series, or a combination thereof. The magnitude of the DC voltage between the negative and positive rails, 29 and 27, is generally equal to the magnitude of the peak of the AC input voltage.

Figure 3:
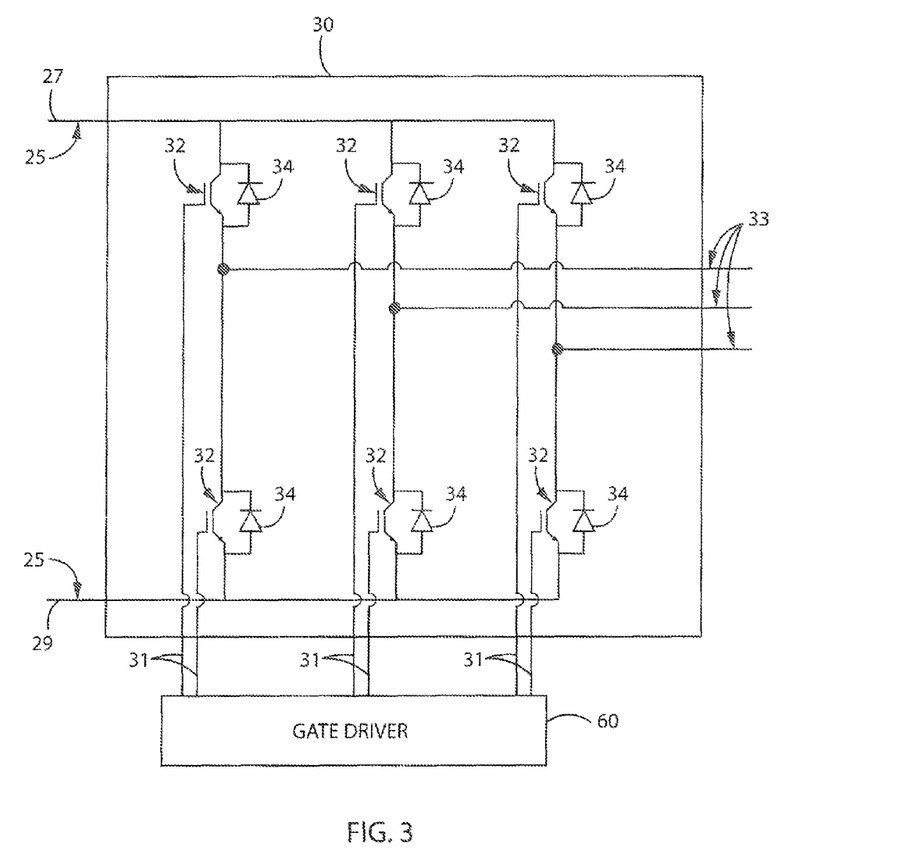
FIG. 3 is a block diagram representation of an inverter section and gate driver module from the motor drive of FIG. 1.

The DC bus 25 is connected in series between the rectifier section 20 and an inverter section 30. Referring also to FIG. 3, the inverter section 30 consists of switching elements, such as transistors, thyristors, or SCRs as is known in the art. The illustrated inverter section 30 includes an insulated gate bipolar transistor (IGBT) 32 and a free wheeling diode 34 connected in pairs between the positive rail 27 and each phase of the output voltage as well as between the negative rail 29 and each phase of the output voltage. Each of the IGBTs 32 receives gating signals 31 to selectively enable the transistors 32 and to convert the DC voltage from the DC bus 25 into a controlled three phase output voltage to the motor 40. When enabled, each transistor 32 connects the respective rail 27, 29 of the DC bus 25 to an electrical conductor 33 connected between the transistor 32 and the output terminal 35. The electrical conductor 33 is selected according to the application requirements (e.g., the rating of the motor drive 10) and may be, for example, a conductive surface on a circuit board to which the transistors 32 are mounted or a bus bar connected to a terminal from a power module in which the transistors 32 are contained. The output terminals 35 of the motor drive 10 may be connected to the motor 40 via a cable including electrical conductors connected to each of the output terminals 35.

One or more modules are used to control operation of the motor drive 10. According to the embodiment illustrated in FIG. 1, a controller 50 includes the modules and manages execution of the modules. The illustrated embodiment is not intended to be limiting and it is understood that various features of each module discussed below may be executed by another module and/or various combinations of other modules may be included in the controller 50 without deviating from the scope of the invention. The modules may be stored programs executed on one or more processors, logic circuits, or a combination thereof. The controller 50 may be implemented, for example, in a microprocessor, application specific integrated circuit (ASIC), field programmable gate array (FPGA), or other such customizable device. The motor drive 10 also includes a memory device 45 in communication with the controller 50. The memory device 45 may include transitory memory, non-transitory memory or a combination thereof. The memory device 45 may be configured to store data and programs, which include a series of instructions executable by the controller 50. It is contemplated that the memory device 45 may be a single device, multiple devices, or incorporated, for example, as a portion of another device such as an application specific integrated circuit (ASIC). The controller 50 is in communication with the memory 45 to read the instructions and data as required to control operation of the motor drive 10.

According to one embodiment of the invention, the controller 50 receives a reference signal 47 identifying desired operation of the motor 40 connected to the motor drive 10. The reference signal 47 may be, for example, a position reference ($\theta^*$), a speed reference ($\omega^*$), or a torque reference ($T^*$). For a high performance servo control system, the reference signal 47 is commonly a position reference signal ($\theta^*$).

The controller 50 also receives feedback signals indicating the current operation of the motor drive 10. According to the illustrated embodiment, the controller 50 includes a feedback module 65 that may include, but is not limited to, analog to digital (A/D) converters, buffers, amplifiers, and any other components that would be necessary to convert a feedback signal in a first format to a signal in a second format suitable for use by the controller 50 as would be understood in the art The motor drive 10 may include a voltage sensor 51 and/or a current sensor 52 on the DC bus 25 generating a feedback signal corresponding to the magnitude of voltage and/or current present on the DC bus 25. The motor drive 10 may also include one or more voltage sensors 53 and/or current sensors 54 on the output phase(s) of the inverter section 30 generating a feedback signal corresponding to the magnitude of voltage and/or current present on the electrical conductors 33 between the inverter section 30 and the output 35 of the motor drive. A position feedback device 44 may be connected to the motor 40 and operable to generate a position feedback signal ($\theta$) corresponding to the angular position of the motor 40.

The controller 50 utilizes the feedback signals and the reference signal 47 to control operation of the inverter section 30 to generate an output voltage having a desired magnitude and frequency for the motor 40. The feedback signals are processed by the feedback module 65 and converted, as necessary, to signals for the control module 55. The control module 55 also receives the reference signal 47 and executes responsive to the reference signal 47 and the feedback signals to generate a desired output voltage signal to a gate driver module 60. The gate driver module 60 generates the gating signals 31, for example, by pulse width modulation (PWM) or by other modulation techniques. The gating signals 31 subsequently enable/disable the transistors 32 to provide the desired output voltage to the motor 40, which, in turn, results in the desired operation of the mechanical load 42 coupled to the motor 40.

Figure 4:
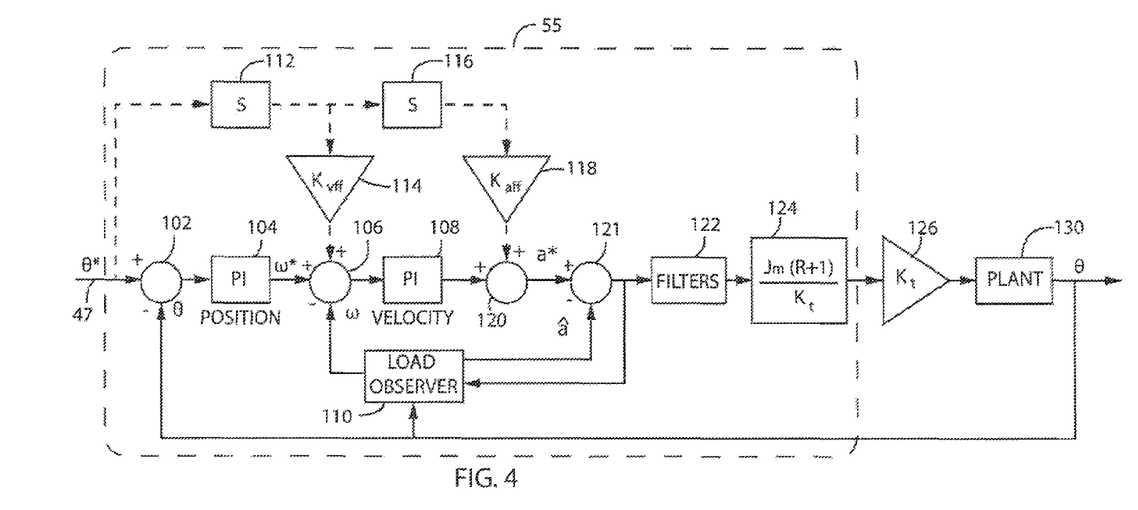
FIG. 4 is a block diagram representation of one embodiment of a control module from the motor drive of FIG. 1.

Referring next to FIG. 4, a control module 55 according to one embodiment of the invention is illustrated. The control module 55 receives a position reference signal ($\theta^*$) as an input. The position reference signal ($\theta^*$) is compared to a position feedback signal ($\theta$) at a first summing junction 102. A position error signal is output from the first summing junction 102 and input to a position loop controller 104. According to the illustrated embodiment, the position loop controller 104 includes a proportional and an integral (PI) controller. Optionally, the position loop controller 104 may be just a proportional (P) controller or further include a derivative (D) controller. Each of the proportional (P), integral (I), and/or derivative (D) controllers of the position loop controller 104 includes a controller gain value. The controller gain values are commonly referred to as a proportional gain (Kpp), integral gain (Kpi), and a derivative gain (Kpd). The output of the position loop controller 104 is a velocity reference signal ($\omega^*$).

The velocity reference signal ($\omega^*$) is compared to a velocity feedback signal (o) at a second summing junction 106. The velocity feedback signal (o) is generated by a load observer 110, which will be discussed in more detail below. A velocity error signal is output from the second summing junction 106 and input to a velocity loop controller 108. According to the illustrated embodiment, the velocity loop controller 108 includes a proportional and an integral (PI) controller. Optionally, the velocity loop controller 108 may be just a proportional (P) controller or further include a derivative (D) controller. Each of the proportional (P), integral (I), and/or derivative (D) controllers of the velocity loop controller 108 includes a controller gain value. The controller gain values are commonly referred to as a proportional gain (Kvp), integral gain (Kvi), and a derivative gain (Kvd). The output of the velocity loop controller 108 is an acceleration reference signal.

The control module 55 may also include feed forward branches. According to the illustrated embodiment, the control module 55 includes feed forward branches for both the velocity and the acceleration elements. The position reference signal (θ*) is passed through a first derivative element 112 to obtain a velocity feed forward signal. The velocity feed forward signal is multiplied by a velocity feed forward gain (Kvff) 114 and combined with the velocity reference signal (tω*) and the velocity feedback signal (ω) at the second summing junction 106. The velocity feed forward signal is passed through a second derivative element 116 to obtain an acceleration feed forward signal. The acceleration feed forward signal is multiplied by an acceleration feed forward gain (Kaff) 118 and combined with the acceleration reference signal at a third summing junction 120. The output of the third summing junction 120 is an acceleration reference, a*.

Although illustrated as an acceleration reference, a*, the output of the third summing junction 120 may be an acceleration or torque reference signal. As is understood in the art, angular acceleration is proportional to torque and, more specifically, torque is equal to inertia times the angular acceleration. In some embodiments of the control module 55, calculations may be performed in a per unit system. Depending on the per unit system, a range of zero to one hundred percent acceleration may be equivalent to a range of zero to one hundred percent torque. As a result, a per unit value of acceleration would be equivalent to a per unit value of torque. In other embodiments, the inertia of the motor or the motor and load may be incorporated into the controller gains of the velocity loop controller 108 and in the acceleration feedforward path to output a torque reference from the third summing junction 120. In still other embodiments, the inertia of the motor may be included in a filter gain to convert the acceleration reference signal output from the third summing junction 120 to a torque reference signal in the filter section 122. In the illustrated embodiment, an inertia scaling block 124 is provided to convert the acceleration reference, a*, to a torque reference.

The output of the third summing junction 120 is combined with a feedback signal from the load observer 110 at a fourth summing junction 121. According to one embodiment of the invention, the load observer 110 provides an estimated load torque, t, present at the motor shaft. Optionally and according to the illustrated embodiment, the load observer provides an estimated acceleration, a, applied to the motor shaft as a result of the load torque. The output of the load observer may be readily scaled between torque and acceleration according to the inertia. The output of the load observer 110 is combined with the output of the third summing junction 120 at the fourth summing junction 121.

Figure 5:
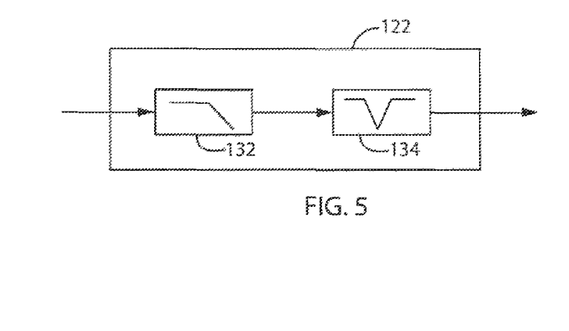
FIG. 5 is a block diagram representation of the filter section from the control module of FIG. 4.

The output of the fourth summing junction 121 is provided as an input to a filter section 122. The filter section 122 may include one or more filters to remove unwanted components from the control system. Referring also to FIG. 5, the illustrated filter section 122 includes a low pass filter 132 to attenuate undesirable high frequency components and a notch filter 134 to attenuate specific frequency components having an undesirable effect on the controlled mechanical load 42. According to one embodiment of the invention and as will be discussed in more detail below, the notch filter 134 is a tracking notch filter 134 which monitors the performance of the motor 40 and of the control system and adaptively adjusts the frequency at which the notch filter 134 is set to obtain desired performance. It is further contemplated that additional filters may be included in the filter section 122 without deviating from the scope of the invention. The output of the filter section 122 is provided to an inertia scaling block 124, and the inertia scaling block 124 applies a gain corresponding to the inertia of the controlled system. The gain of the inertia scaling block 124 includes a motor inertia value, Jm, and a ratio, R, of the load inertia, Jl, to the motor inertia, Jm.

According to the illustrated embodiment, the inertia scaling block 124 further includes the inverse of a torque constant, Kt, which defines a relationship between the torque output by the motor and the current provided to the motor 40. Combining the gains into a single gain block reduces overall computation time for the control module 55. The inverse of the torque constant, Kt, converts a torque reference signal to a current reference within the motor drive 10. Thus, the inertia value converts acceleration reference to a torque reference, which, in combination with the torque constant is converted to a current reference. The motor drive 10 may further include a current controller (not shown) in the control module 55, gate driver module 60, or in a separate module. The current reference is supplied to the motor 40 and, as modeled in FIG. 4, is provided through a torque gain block 126, which includes the torque constant, Kt, and a plant 130 of the controlled system. In a motion control system, the plant 130 typically includes the inverter section 30 of the motor drive 10, the motor 40, a mechanical load 42, and a position feedback device 44. The position feedback device 44 generates the position feedback signal (θ) used by the control module 55.

With reference again to FIG. 1, the output of the control module 55 is provided as an input to the gate driver module 60. The gate driver module 60 converts the input to a desired output voltage having a variable amplitude and frequency. Having determined the output voltage required to produce the desired input, the gate driver module 60 generates the gating signals 31 used by pulse width modulation (PWM) or by other modulation techniques to control the switching elements in the inverter section 30 to produce the desired output voltage. The gating signals 31 subsequently enable/disable the switching elements 32 to provide the desired output voltage to the motor 40, which, in turn, results in the desired operation of the mechanical load 42 coupled to the motor 40.

As discussed above, the control module 55 may include a number of controller gains and filter settings which affect performance of the motor drive 10. The controller gain values and filter settings need to be adjusted in order to achieve a desired performance level. Settings for each of the controller gain values and filter settings are stored in configuration parameters in a non-volatile portion of the memory device 45 to retain the settings when power is removed from the motor drive 10. Typically, the settings are transferred to a volatile portion of the memory device 45 upon applying power to the motor drive 10 to provide for quick reads of the values for use in execution of the control module 55.

According to one embodiment of the invention, selection of the controller gain values and filter settings are based upon a determination of a drive model time constant (DMTC) for the motor drive 10 and the motor 40. The DMTC is a sum of delays occurring within the torque loop of the motor drive 10. The response of the torque loop is determined as a function of multiple variables in the motor drive 10. At a high level, the response may be thought of as the time it takes the motor drive 10 to generate an output to the motor 40 to achieve a desired performance. As previously discussed, the motor drive 10 includes a current controller which may be implemented in the control module 55, the gate driver module 60, or in a separate module. The current controller compares the current reference signal from the control module 55 to the current feedback signal from one or more of the current sensors 54 and determines a current error signal. The motor drive 10 converts the current error signal into the output voltage necessary to compensate for the current error signal and generates the gating signals 31 for the switching devices 32 that will result in the desired output voltage. The controller gain values selected for the current controller result in a time constant for the current controller. The time constant of the current controller is one component of the DMTC for the motor drive 10.

A second component of the DMTC is the rate at which feedback signals are sampled. As discussed above, the feedback module 65 receives signals, for example, corresponding to the current and/or voltage present on the DC bus 25 or conductors 33 at the output of the motor drive 10. These signals must be sampled at a discrete interval and converted into a digital value suitable for use by the controller 50. The motor drive 10 executes on a periodic interval to sample the feedback signals and to recalculate the desired output voltage as a function of the newly sampled feedback signal. The period at which the feedback sampled is another component of the DMTC. Further, the controller 50 in the motor drive 10 may be responsible for a number of functions, such as communicating with external devices or providing information on a display as feedback to a technician, in addition to executing the control module 55. As a result, computation of the desired output voltage may not occur immediately after sampling the feedback signal. Also, each of the steps required to complete execution of the control module 55 require a finite computational time. A calculation delay, corresponding to the amount of time required to complete the calculations for determining the desired output voltage after sampling the feedback signals, is still another component of the DMTC.

As seen in FIG. 4, the acceleration reference signal, a*, is determined based on the position feedback signal, θ, generated by the position feedback device 44 and on the velocity feedback signal, ω, determined by the load observer 110. During the process of determining the velocity feedback signal, a filter may be applied to the position feedback signal, θ. Filtering the position feedback signal, θ, reduces undesirable components from the velocity feedback signal and, in turn, from the acceleration reference signal, a*, generated by the velocity controller 108. However, the filter, if present, introduces an additional delay in the control loop and, therefore, is also considered a component of the DMTC.

Thus, the DMTC for the motor drive is determined as a sum of the time constant of the current controller, the feedback sample period for the motor drive, the calculation delay for the motor drive, and the velocity feedback filter time for the motor drive. It is contemplated that these values will vary based on the motor drive 10 and/or the motor 40 to which the motor drive 10 is connected. The values may be fixed values or, optionally, the values may be configurable from a keypad and/or programming software executing on a computer or other device external to the motor drive 10. During an initial commissioning run, or on power-up, the motor drive 10 may determine the DMTC based on the sum of the time constant of the current controller, the feedback sample period, the calculation delay, and the velocity feedback filter time for the motor drive.

Having determined the DMTC, the controller 50 may determine each of the controller gain values in the control module 55. According to one embodiment of the invention, the bandwidth of the load observer 110 is equal to $1/(2\pi \cdot DMTC)$. The bandwidth for the velocity loop controller 108 and bandwidth for the position loop controller 104 are preferably spaced apart from each other and from the bandwidth of the load observer 110 a sufficient amount to provide a stable control module 55. When controllers are cascaded, as shown in FIG. 4, it is desirable to set the bandwidth of each control loop located sequentially inward from the outermost control loop at a higher bandwidth, such that the inner control loops are able to respond to commands generated from the external control loops.

According to one embodiment of the invention, the bandwidth of the velocity loop controller 108 is one-quarter of the bandwidth of the load observer 110 and the bandwidth of the position loop controller 104 is one quarter of the bandwidth of the velocity loop controller 108. It is further contemplated, that the bandwidth of the position loop controller 104 and the velocity loop controller 108 may be determined as a function of a desired level of damping, ζ, within the motor drive 10. In addition to spacing the bandwidths of the successive loops by a factor of four, the bandwidths may also be spaced as a square of the desired level of damping, ζ, within the motor drive 10. Thus, the bandwidth of the velocity loop controller 108 may be set to $1/(4\zeta^2)$ times the bandwidth of the load observer 110 and the bandwidth of the position loop controller 104 may be set to $1/(4\zeta^2)$ times the bandwidth of the velocity loop controller 108. Similar to determination of the DMTC, each of the controller gain values may be determined in the motor drive 10 during an initial commissioning run or on power-up. It is further contemplated that the gain values may be determined once and stored in the memory device 45 for subsequent operation of the motor drive 10.

The control module 55 includes at least one filter and, according to one embodiment of the invention, includes a low pass filter 132 and at least one tracking notch filter 134.

The pass band of the low pass filter 132 is set greater than the bandwidth of the load observer 110 and, preferably, about five times greater than the bandwidth of the load observer 110. The low pass filter 132 suppresses vibrations at high frequencies. The tracking notch filter 134 may then be used to suppress resonances present at frequencies above the bandwidth of the load observer 110 and within the pass band of the low pass filter 132. As will be discussed in more detail below, the motor drive 10 monitors feedback from the motor 40 and determines the frequency of the resonance with the highest amplitude during operation of the motor 40. The motor drive 10 will adjust the frequency of the notch filter 134 to track the frequency of the resonance and mitigate or cancel the effects of the resonance during operation of the motor 40.

In operation, the load observer 110 is operable to compensate for the inertia of a load 42 applied to the motor 40 and to suppress vibration and resonances detected within the desired operating bandwidth for the motor 40. The inertia scaling block 124 may be configured to ignore load inertia, Jl, and the load observer 110 compensates for the load dynamics. Consequently, a motor inertia value, which corresponds to an inertia value for the motor 40 when no load is connected to the motor 40, may be read from the memory device 45 and used as the motor inertia, Jm, in the inertia scaling block 124. The ratio, R, of the load inertia, Jl, to the motor inertia, Jm, is preferably set to zero. This may be done either by setting the ratio, R, directly to zero or by setting the load inertia, Jl, to zero and subsequently determining the ratio, R. As illustrated in FIG. 4, by setting the ratio, R, to zero, the inertia component of the inertia scaling block 124 becomes equal to the inertia value for the motor 40 when no load is connected to the motor 40.

Because the controller 50 is configured to control an unloaded motor 40, the controller gain values may be determined in advance and stored in the memory device 45. A table may be stored in memory 45 corresponding to a number of motors 40 which may be connected to the motor drive 10. Initial commissioning runs of the unloaded motor 40 may be performed, for example, by the manufacturer of the motor drive 10 to determine the operating characteristics of the unloaded motor 40 and motor drive 10. A set of bandwidths, filter settings, and controller gain values may be determined and stored in the table in the memory 45 for each of the motors 40. An end user may then select one of the motors 40 from the table that will be connected to the motor drive 10 according to the application requirements, and each of the stored bandwidths and controller gain values may be read from the table in memory 45 and utilized as the operating parameters for the motor drive 10.

Although an initial value of the notch frequency, $F_N$, may be set, it may be necessary to adjust the value during operation to maintain the desired performance. Variable conditions including, but not limited to, temperature fluctuation, humidity variation, and component wear may cause the dynamics of the controlled system to change. In addition, resonant operating points, not observed during initial tuning of the control module 55, may manifest during operation of the controlled system. The controller 50, therefore, may adjust the notch frequency, $F_N$, to track changes in existing resonances or new resonances developing in the controlled system during operation of the motor 40.

As indicated above, it is further contemplated that the controller 50 is configured to automatically adjust the frequency of the tracking notch filter 134 during operation of the motor 40. The frequency, $F_N$, of the notch filter may initially be set at a frequency between the bandwidth of the load observer 110 and the low-pass passband or, optionally, a known reference signal may be applied to the system to determine a resonant frequency of the controlled system. The known reference signal may be, for example, a position reference signal ($\theta^*$) varying at a known rate, a velocity reference signal ($\omega^*$), or a torque reference signal ($T^*$). While the known reference signal is applied to the system, a signal corresponding to the response of the controlled system is measured. The signal preferably corresponds to either an internally computed signal or a measured feedback signal related to the torque and/or current output to the motor 40 when the known reference signal is applied. According to one embodiment of the invention, a feedback signal from one of the current sensors 54 at the output from the inverter section 30 is used for the response data. A series of values of the current feedback signal while the motor 40 is operating are sampled and stored in the memory device. A frequency response of the system may be determined from the series of stored values and an initial notch frequency, $F_N$, is set to a resonant frequency as identified in the frequency response.

The frequency response is a measurement of a signal providing a magnitude and phase of the signal as a function of frequency. In order to determine the frequency response of a signal, a continuous function defining the signal may be determined and a Fourier transform of the continuous function is performed. The Fourier transform expresses the function as a function of frequencies over an infinite frequency interval. However, determining the Fourier transform of a continuous function is computationally intensive. In order to reduce the computation requirements for the frequency analysis of the signal to a suitable level for real-time control, the signal is sampled over a defined sample interval at a sampling frequency and the sampled data is stored in memory. A Discrete Fourier Transform (DFT) is performed on the sampled data to express the stored signal as a discrete set of complex vectors having magnitude and phase information of the sampled signal over a finite frequency interval.

According to one embodiment of the invention, the controller 50 monitors two signals within the controlled system. A first monitored signal corresponds to a command signal and a second monitored signal corresponds to a response signal. With reference to FIG. 4, the monitored command signal may be the position reference signal ($\theta^*$), the velocity feed forward signal, or the acceleration feed forward signal. Preferably, the command signal is selected as the acceleration feed forward signal. The monitored response signal may be taken after the third summing junction 120 and before the output to the plant 130. Preferably, the monitored response signal is after the filters 122 and prior to the torque gain block 126.

The controller 50 continually stores values of the monitored signals in the memory device 45 on a periodic basis while the motor drive 10 is operating. Preferably, a buffer is defined in the memory device 45 having a fixed length and data is stored on a first-in-first-out (FIFO) basis in the buffer. The controller 50 obtains the frequency response of the stored data for both the monitored command signal and the monitored response signal while also controlling operation of the motor 40. A DFT is evaluated to determine the frequency response of the stored signals. The controller 50 generates a command spectrum and response spectrum, each of which identifies a frequency, or frequencies, having the greatest magnitude information based on the monitored command signal and the monitored response signal, respectively. In the frequency response, the frequency, or frequencies, with the greatest magnitude information are those most excited by the control system and the response at those frequencies may need to be reduced.

The controller 50 then evaluates the command spectrum and the response spectrum to determine how best to respond to the identified frequency. If, for example, the controller 50 is being commanded to perform a repeated operation, the frequency in the response spectrum having the greatest magnitude may be a desired operation and, therefore, correspond to a frequency in the command spectrum. Tuning the controller 50 to reduce the magnitude of this frequency in the response spectrum would be detuning a desirable response. If, however, the frequency identified in the response spectrum with the greatest magnitude information is not in the command spectrum, the controller 50 may adjust the notch frequency, $F_N$, to correspond to the resonant frequency in order to reduce or mitigate the response.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A method for controlling operation of a motor operatively connected to a motor drive, the method comprising the steps of:
   determining a bandwidth for a load observer executable in the motor drive, wherein the bandwidth is greater than or equal to an expected torque response generated from a load operatively connected to the motor;
   reading a motor inertia value from a memory of the motor drive, wherein the motor inertia value corresponds to an inertia value for the motor when no load is connected to the motor;
   executing a control module with a processor in the motor drive, wherein the control module includes:
      a control loop receiving a reference signal and a feedback signal, wherein:
         the reference signal is selected from one of a position reference, a speed reference, and a torque reference,
         the feedback signal corresponds to an angular position of the motor, and
         the control loop generates a first acceleration reference signal corresponding to a desired operation of the motor,
      the load observer receiving the feedback signal corresponding to the angular position of the motor and a second acceleration reference signal, wherein the load observer generates an estimated acceleration signal corresponding to the load present on the motor;
      a summing junction combining the first acceleration reference signal and the estimated acceleration signal to generate the second acceleration reference signal;
      at least one filter configured to receive the second acceleration reference signal as an input and provide a filtered acceleration reference signal as an output; and
      an inertia scaling factor set equal to the motor inertia value, wherein the inertia scaling factor is a gain applied to the filtered acceleration reference signal to generate a desired torque command for the motor; and
   supplying at least one of a desired voltage and a desired current from the motor drive to the motor as a function of the desired torque command.

2. The method of claim 1 wherein the bandwidth of the load observer is a function of a drive model time constant (DMTC) and the DMTC is determined as a sum of a time constant of a current controller for the motor drive, a feedback sample period for the motor drive, a calculation delay for the motor drive, and a time constant of a velocity feedback filter for the motor drive.

3. The method of claim 2 wherein the bandwidth of the load observer is equal to the inverse of the product of $2\pi$ times the DMTC.

4. The method of claim 1 wherein the at least one filter includes a tracking notch filter and wherein a notch frequency of the tracking notch filter is set greater than or equal to the bandwidth of the load observer.

5. The method of claim 4 further comprising the steps of:
   identifying at least one resonant frequency present in at least one of the desired voltage and the desired current supplied to the motor during operation of the motor; and
   setting the notch frequency equal to the frequency of one of the at least one resonant frequencies having an amplitude greater than an amplitude of each of the other resonant frequencies.

6. The method of claim 1 wherein the control loop includes at least one of a position control loop and a velocity control loop and the position control loop and the velocity control loop each include a proportional controller and an integral controller.

7. The method of claim 6 wherein a bandwidth of the proportional controller of the velocity control loop is equal to the bandwidth of the load observer divided by a square of a desired damping factor and divided by four, a bandwidth of the proportional controller of the position control loop is equal to the bandwidth of the proportional controller of the velocity loop control divided by the square of the desired damping factor and divided by four, and the integral gain values for both the velocity and proportional control loops are zero.

8. A motor drive for controlling a motor operatively connected to the motor drive, the motor drive, comprising:
   a DC bus having a positive rail and a negative rail, wherein the DC bus is operable to receive a DC voltage between the positive rail and the negative rail;
   an inverter section having a plurality of switching elements, wherein each switching element is controlled by a gating signal and wherein the inverter section is operable to receive the DC voltage from the DC bus and provide an AC voltage at an output of the motor drive;
   a memory device operable to store a plurality of instructions and a plurality of configuration parameters, wherein the configuration parameters include a motor inertia value corresponding to an unloaded state of the motor;
   an input configured to receive a feedback signal corresponding to an angular position of the motor connected to the motor drive;
   a controller operable to execute the plurality of instructions to:
      determine a bandwidth for a load observer wherein the bandwidth is greater than or equal to an expected torque response bandwidth generated from a load operatively connected to the motor,
      read the motor inertia value from the memory device,
      set an inertia scaling factor equal to the motor inertia value,
      receive the feedback signal from the input, receive a reference signal, wherein the reference signal is selected from one of a position reference, a speed reference, and a torque reference, generate a first acceleration reference signal corresponding to a desired operation of the motor with a control loop as a function of the feedback signal and of the reference signal, generate an estimated acceleration signal corresponding to the load present on the motor with the load observer as a function of the feedback signal and of a second acceleration reference signal, combine the first acceleration reference signal and the estimated acceleration signal at a summing junction to generate the second acceleration reference signal, execute at least one filter configured to receive the second acceleration reference signal as an input and provide a filtered acceleration reference signal as an output, and apply the inertia scaling factor to the filtered acceleration reference signal to generate a desired torque command for the motor; and a gate driver module operable to generate the gating signal for each of the plurality of switching elements in the inverter section as a function of the desired torque command from the controller.

9. The motor drive of claim 8 wherein the bandwidth of the load observer is a function of a drive model time constant (DMTC) and the DMTC is determined as a sum of a time constant of a current controller for the motor drive, a feedback sample period for the motor drive, a calculation delay for the motor drive, and a time constant of a velocity feedback filter for the motor drive.

10. The motor drive of claim 9 wherein the bandwidth of the load observer is equal to the inverse of the product of $2\pi$ times the DMTC.

11. The motor drive of claim 8 wherein the at least one filter includes a tracking notch filter and wherein a notch frequency for the tracking notch filter is set greater than the bandwidth of the load observer.

12. The motor drive of claim 11 wherein the controller is further operable to:

identify at least one resonant frequency present in at least one of a desired voltage and a desired current supplied to the motor during operation of the motor, and set the notch frequency equal to the frequency of the one of the at least one resonant frequencies having an amplitude greater than an amplitude of each of the other resonant frequencies.

13. The motor drive of claim 8 wherein the control loop includes at least one of a position control loop and a velocity control loop and the position control loop and the velocity control loop each include a proportional controller and an integral controller.

14. The motor drive of claim 13 wherein a bandwidth of the proportional controller of the velocity control loop is equal to the bandwidth of the load observer divided by a square of a desired damping factor and divided by four, a bandwidth of the proportional controller of the position control loop is equal to the bandwidth of the proportional controller of the velocity loop control divided by the square of the desired damping factor and divided by four, and the integral gain values for both the velocity and proportional control loops are zero.

* * * * *